United States Patent [19]
Guerin

[11] Patent Number: 5,473,358
[45] Date of Patent: Dec. 5, 1995

[54] MULTI-LEVEL XEROGRAPHY EXPOSURE CONTROL THROUGH MULTI-BEAM OVERSCAN

[75] Inventor: Jean-Michel Guerin, Glendale, Calif.

[73] Assignee: Xerox Corporation, Stamford, Conn.

[21] Appl. No.: 170,948

[22] Filed: Dec. 21, 1993

[51] Int. Cl.⁶ .................................................. B41J 2/47
[52] U.S. Cl. ................................. 347/240; 347/253
[58] Field of Search .............................. 347/240, 237, 347/251, 253, 131

[56] References Cited

U.S. PATENT DOCUMENTS

| | | | |
|---|---|---|---|
| 4,027,312 | 5/1977 | Schlafer et al. | 355/20 |
| 4,265,532 | 5/1981 | McIntosh | 355/20 |

*Primary Examiner*—Mark J. Reinhart
*Attorney, Agent, or Firm*—Fariba Rad

[57] ABSTRACT

A raster output scanning system is disclosed which utilizes two light beams to double scan two scan lines on a photoreceptor in order to generate three exposure levels required for a tri-level printing system. In the raster output scanner of this invention, the two light beams scan two separate scan lines. At the completion of the simultaneous scanning of two light beams when the first light beam starts to scan a new scan line, the second light beam start to scan the scan line that the first light beam just completed scanning. In this invention the first light beam generates two exposure levels and the second light beam adds additional exposure to the second exposure level in order to generate a third exposure level. The same method can be utilized to generate additional levels for printing systems with more xerographic levels than three.

4 Claims, 5 Drawing Sheets

MULTI-LEVEL XEROGRAPHY EXPOSURE CONTROL THROUGH MULTI-BEAM OVERSCAN

BACKGROUND OF THE INVENTION

This invention relates to a multi-level xerographic system such as high light color systems. More particularly, this invention relates to a xerographic system which utilizes multi-beams to overscan each line to generate multiple levels of xerographic exposures.

A conventional raster output scanner utilizes either a light source, a modulator and a multi-faceted rotating polygon mirror as the scanning element or a light source, which serves as both a light source and a modulator, along with a multi-faceted rotating polygon mirror. In a raster output scanner with a light source and a separate modulator, the light source, which can be a laser source, generates a light beam and sends it to the modulator. The modulator receives pixel information and modulates the pixel information onto the light beam. However, in the raster output scanner without a separate modulator, the light source, which can be a laser diode, both generates and modulates the light beam. Then, the modulated light beam is directed onto a facet of a rotating polygon mirror. The rotating polygon mirror reflects the light beam and also causes the reflected light to revolve about an axis near the center of reflection of the rotating polygon and scan a straight line. This reflected light beam can be utilized to scan a document at the input of an imaging system or can be used to impinge upon a photographic film or a photosensitive medium, such as a xerographic drum at the output of the imaging system.

A tri-level printing system is a system which uses two color inks. A typical tri-level system utilizes a single light beam which will be modulated to have two different pixel informations, one for the first ink and the second for the second ink. The single light beam, modulated by two different trains of pixel informations, will expose the photoreceptor plane at three different exposure levels: one level for color ink, one level for black ink and the third level for no printing. It should be noted that for each pixel the photoreceptor will be exposed by only one of these three levels.

Referring to FIG. 1, there is shown a train 10 of different exposure levels on the photoreceptor corresponding to different pixels of a tri-level system. Usually in a tri-level system, level 12, which is the lowest level and usually is kept at 0 volts (ground level), represents black ink and is called black level. Level 14 represents no printing and is called white level. White is a term used for no printing since when there is no printing the color of the paper which usually is white will be shown. Of course, if a different color paper is used, white level represents the color of the paper. Finally level 16 represents a second ink which can have any color other than black and the color of paper.

The modulation of a single light beam with two different pixel informations can be achieved through various methods such as amplitude modulation or pulse width modulation.

In tri-level systems, the amplitude modulation is based on three levels. Typically in a black and white printing system, the light beam will be modulated to be either On or Off. With amplitude modulation for tri-level, the light beam will be turned On or Off, but when it is turned On, it will have either full intensity for color or it will have a lesser intensity for white. The full intensity creates the highest level 16 of exposure on the photoreceptor, the lesser intensity creates the exposure level 14 and when the light beam is turned Off, it will create the lowest level of exposure 12.

The same result can be achieved by utilizing a pulse width modulation. In Pulse width modulation the width of each pulse determines the amount of exposure. Depending on the width of the pulse for each pixel the photoreceptor will be exposed less or more. For color level 16 the width of the pulse is more than the width of the pulse for the white level 14 and for the black level there is no pulse. Therefore, if the pulse has a shorter pulse width the photoreceptor will be exposed less (white level) and if the pulse has a longer pulse width, the photoreceptor will be exposed for a longer time and therefore it will reach to a higher exposure level 16 (color level).

The problem with amplitude modulation is controlling the color level and the white level. A slight variation in the color level causes the color to become either lighter or darker. However, the problem with variation of the white level is more severe than the variation of the color level. If the white level varies, instead of no printing, a pale color or a pale gray will be printed on the paper. Therefore, keeping the white level at a precise level is more critical. Typically, to control the white level the power of the laser diode will be divided into small steps which will be used to adjust the white level. The more the number of the steps, the more the control over the white level.

Also, for the color level, the power of the laser diode is divided into steps. However, the number of the steps for the color level is less than the number of the steps for the white level. Typically, a single channel laser diode is utilized to produce a light beam for both the white level and the color level. This requires the laser diode to have a high power adjustment (high number of steps) for the white level and also a reasonable power adjustment for the color level which usually is a difficult requirement to be placed on a single channel. Also, since the single channel has to produce the light beam for both levels, it has to work in a power range which covers both levels. This also adds to the complexity of the power adjustment for both levels.

The problem with pulse width modulation is the required high frequency. In pulse width modulation, for every change of level (color change) a pulse should be generated. Therefore, for high resolution printing systems which have higher number of pixels per inch (higher number of color changes), if a pulse width modulation is used, the frequency will be very high.

SUMMARY OF THE INVENTION

This invention suggests a different approach which can be expanded to multi-color systems with more exposure levels than three. In this invention two different light beams are used to scan one scan line to create the different exposure levels necessary for a tri-level printing. By utilizing two light beams, one of the light beams scans a scan line once and when the first light beam starts to scan a different scan line, the second light beam starts to scan over the scan line which is already scanned by the first light beam. With this approach each scan line will be scanned twice.

This approach solves the aformentioned problems. By utilizing two channels of a multi-channel laser diode, one channel can be dedicated to produce the white level and the second channel can be dedicated to produce the color level. This allows each channel to be controlled for a different requirement and also each channel has a lower power range to cover which improves the power adjustment.

Also, by utilizing two channels of a multi-channel laser diode, since each channel is responsible to produce one level, the number of the level changes for each channel will be less than the number of level changes for a single channel laser diode. Therefore, the modulation frequency of each channel will be much less than the frequency of a single channel laser diode.

DESCRIPTION OF THE PREFERRED EMBODIMENT

Figure 1:
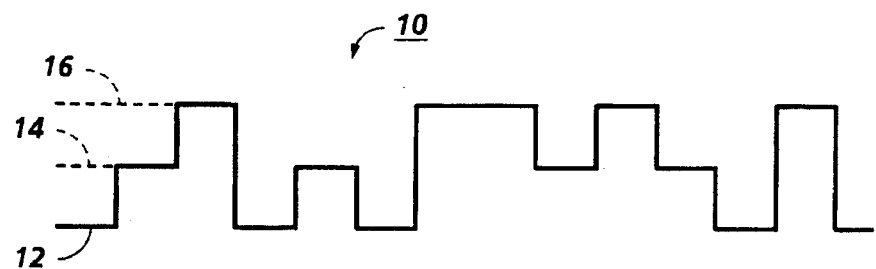
FIG. 1 shows a train of different exposure levels on the photoreceptor corresponding to different pixels of a tri-level system.
Figure 2:
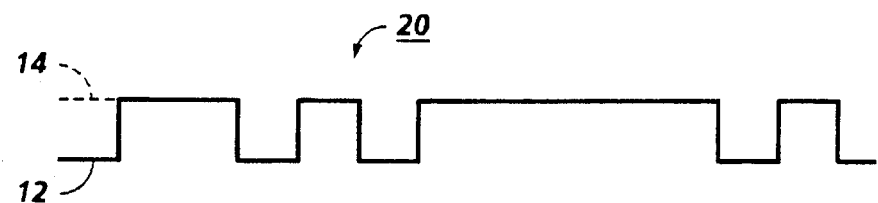
FIG. 2 shows a train of pulses to modulate one of the two light beams suggested by this invention in order to achieve the exposure levels shown in FIG. 1.
Figure 3:
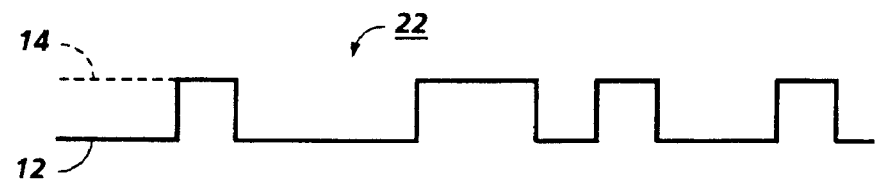
FIG. 3 shows a train of pulses to modulate the other one of the two light beams suggested by this invention in order to achieve the exposure levels shown in FIG. 1.

Referring to FIGS. 2 and 3, there are shown two different trains 20 and 22 of pixel information which are used to modulate the two light beams suggested by this invention in order to achieve the exposure levels shown in FIG. 1. The train of pulses 22 shown in FIG. 2 will be used to modulate the first light beam and the train of pulses 22 will be used to modulate the second light beam.

Referring to FIGS. 2 and 3, when the first light beam scans the photoreceptor, it creates the black exposure level 12 and the white exposure level 14. When the second light beam overscans the same line on the photoreceptor plane, it exposes the photoreceptor for a second time and therefore the exposure from the second light beam adds to the exposure level 14 created by the first light beam to generate the color level 16 (FIG. 1). For example, to create the color level 16, when the first light beam scans the photoreceptor, it creates the white level 14 and when the second light beam scans the photoreceptor, an extra level 24 (FIG. 3) from the second light beam will be added to the white level 14 which generates the color level 16. As it can be observed, by adding the two trains of pulses 20 and 22 of FIGS. 2 and 3, the train of exposure levels shown in FIG. 1 can be created.

Figure 4:
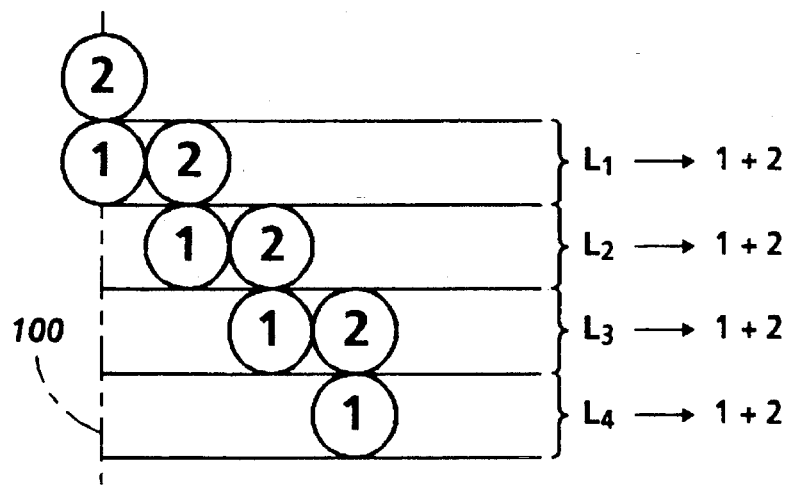
FIG. 4 shows an example of double scanning with two light beams in which the light beams have one scan line separation between them.

Double scanning can be done with different scan separations between the two light beams. Referring to FIG. 4, there is shown a double scanning with two light beams 1 and 2 with one scan line separation between them. It should be noted that the scan line separation is the space between the two centers of the two light beams The two light beams 1 and 2 scan two adjacent scan lines. Considering all scan lines above the scan line L1 to be outside of the printing boundary, when the light beam 1 scans the scan line L1, the light beam 2 scans along a line which is outside of the printing boundary. When the light beam 1 completes scanning the line L1, the photoreceptor moves in such a way that the light beam 1 starts scanning the scan line L2. At this time, the light beam 2 starts scanning the scan line L1. Therefore, while the light beam 1 scans the scan line L2, light beam 2 scans over line L1 which is already scanned by the light beam 1.

It should be noted that the laser light source is stationary and the photoreceptor moves in a direction perpendicular to the direction of the scan. However, for the purpose of simplicity of describing the invention, at the end of each scan, when the photoreceptor moves in such a manner that the light beams will start scanning different scan lines, hereinafter will be referred to as the relative movement of the light beams.

As the light beam 1 moves onto the start of the next line to be scanned, light beam 2 follows the light beam 1 onto the start of the line which the light beam 1 just completed scanning.

It should be noted that in FIG. 4 and also in the following FIGS. 5, 6, 7 and 8, for the purpose of clarity, the light beams on different scan lines are shown on different locations. However, the light beams start scanning each line from line 100 which is the start of scan for all the scan lines.

Figure 5:
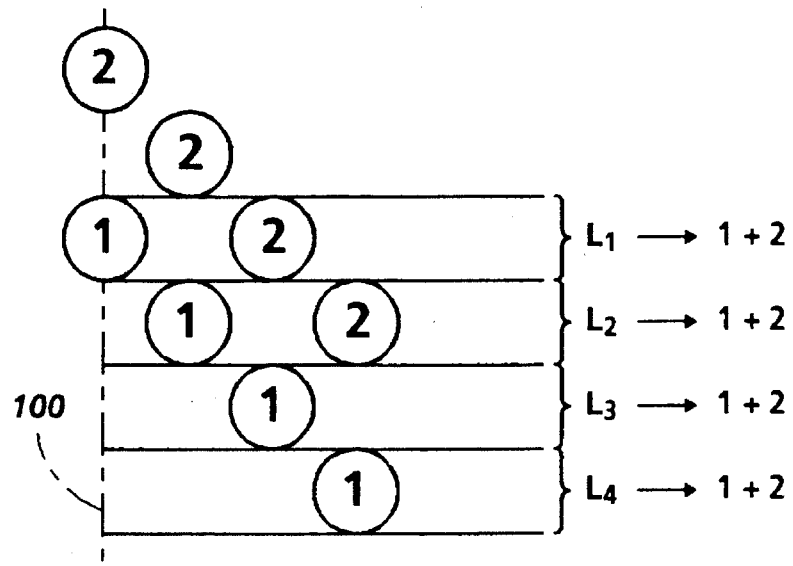
FIG. 5 shows an example of double scanning with two light beams in which the light beams have two scan line separation between them.

Referring to FIG. 5, there is shown a double scanning with two light beams 1 and 2 which have two scan line separation between them. With one scan line separation, the light beam 1 starts scanning line L1, while the light beam L2 scans a line outside of the printing boundary. Then the light beam 1 moves onto line L2 and light beam 2 moves onto a line still outside of the printing boundary. When the light beam 1 moves onto line L3, then light beam 2 moves onto line L1 which is already scanned by light beam 1. As the light beam 1 moves onto the next line to be scanned, the light beam 2 moves onto a line which is one line apart from the line that the light beam 1 is on. With this approach, the light beams can be apart by as many scan lines as desired.

Double scanning can also be achieved through four light beams. With this approach, a pair of light beams will be assigned to double scan certain scan lines and the other pair will be assigned to double scan the remaining scan lines.

Figure 6:
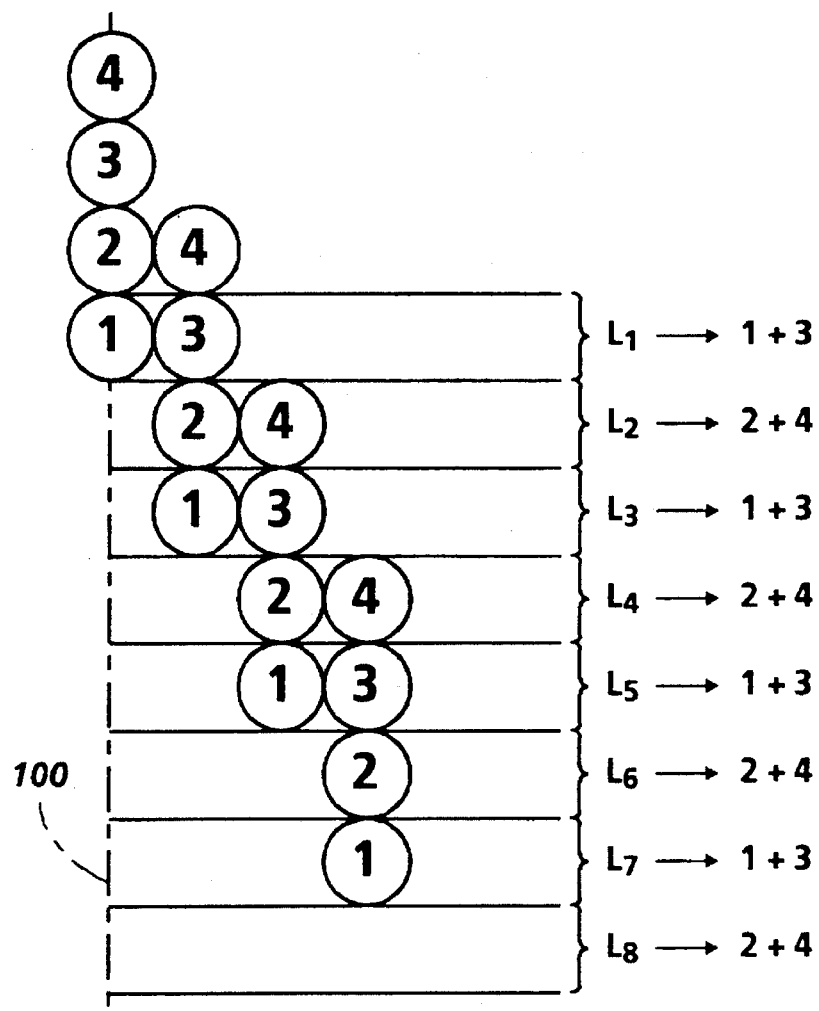
FIG. 6 shows an example of double scanning with four light beams in which the light beams have one scan line separation between them.

Referring to FIG. 6, there is shown an example of double scanning with four light beams 1, 2, 3 and 4. In this example, light beams 1 and 3 are assigned to double scan the scan lines L1, L3, L5 and L7 and the light beams 2 and 4 are assigned to double scan lines L2, L4, L6 and L8.

To double scan the scan lines with four light beams, an interlace format should be used. When light beam 1 starts scanning the scan line L1, the light beams 2, 3 and 4 scan some lines outside of the printing border. When the light beam 1 reaches the end of the scan line L1 it moves onto the scan line L3. At the same time, light beams 2 and 3 move onto scan lines L2 and L1 respectively. At the end of scan line L3, light beam 1 moves onto line L5 and the light beams 2, 3 and 4 move onto the scan lines L4, L3, L2 respectively. In this fashion, all the scan lines will be double scanned. As it can be observed, scan lines L1, L3, L5 and L7 will be scanned by the light beams 1 and 3 and the scan lines L2, L4, L6 and L8 will be double scanned by the light beams 2 and 4.

As in the case of double scanning with two light beams in which the two light beams can have multi-scan line separation between the two light beams, with four light beams double scanning, the light beams can also have multi-scan line separation.

Figure 7:
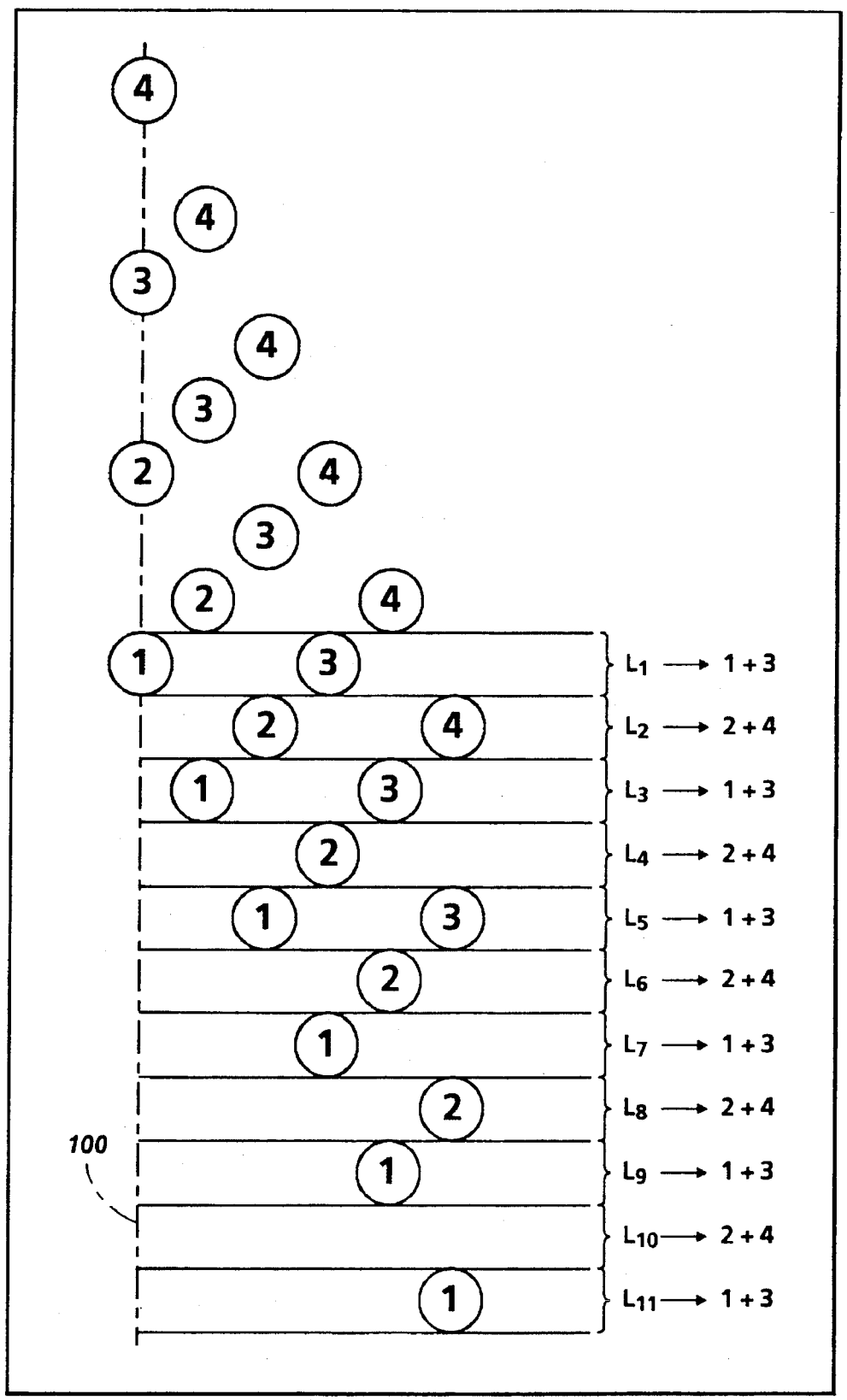
FIG. 7 shows an example of double scanning with four light beams in which the light beams have multi-scan line separation.

Referring to FIG. 7, there is shown an example of double scanning with four light beams which have multi-scan line separation. In this example, there are two scan line separation between each two light beams. However, the light beams scan the scan lines with an interlace format.

When light beam 1 starts to scan line L1, the light beams 2, 3 and 4 scan lines which are outside of the printing boundary. When the light beam 1 moves onto the scan line L3, the light beams 2, 3 and 4 are still outside of the printing boundary. When light beam 2 moves onto the scan line L5, light beam 2 moves onto the scan line L2 and when light beam 1 moves onto the scan line L7, light beams 2 and 3 move onto the scan line L4 and L1 respectively. In this fashion, scan lines L1, L3, L5, L7, L9 and L11 will be double scanned by light beams 1 and 3 and the scan lines L2, L4, L6, L8 and will be double scanned by light beams 2 and 4.

In all the above examples there is a method in selecting the number of the light beams and the number of the scan lines which the light beams should move while moving from one scan line onto the next line to be scanned. For double scanning with two light beams with or without separation between the two light beams, the light beams should scan the scan lines consecutively. However, for double scanning with four light beams with or without separation between the two light beams, the light beams should move by two scan lines while moving from one scan line onto the next line to be scanned. Therefore, depending on the number of the light beams used, which should be an even number, the light beams should move by a number of scan lines equal to half the number of the light beams.

This concept can be applied to printing systems with more xerographic levels than three. In general, the number of the light beams and the number of the scan lines that the light beams should move while moving from one scan line to the next with respect to the number of the xerographic levels should agree with the following equation:

$$N=n(K-1).$$

Where N is the number of the light beams, n is an integer equal to the number of the scan lines that the light beams should move while moving from one scan line onto the next line to be scanned and K is the number of the xerographic levels including the zero exposure level.

It should be noted that for $n \geq 2$ the number of scan line separation between light beams (the space between the centers of the two light beams) should be at opposite parity of n, wherein parity is defined as even or odd.

For example, in a tri-level system which has three xerographic levels, K is equal to 3. If n is selected to be 1, then the number of the light beams should be 2;

$$N=1(3-1)=2.$$

In this case, the light beams have to move by one scan line in order to move from one scan line to the next line to be scanned.

However, if n is selected to be 2, then the number of the light beams should be 4;

$$N=2(3-1)=4.$$

In this case, the light beams have to move by two scan lines in order to move from one scan line to the next line to be scanned and the number of scan line separation between the two light beams could be 1 (such as FIG. 6), 3 (such as FIG. 7), 5, 7, etc.

Yet, if n is selected to be 3, then the number of the light beams should be 6;

$$N=3(3-1)=6.$$

Figure 8:
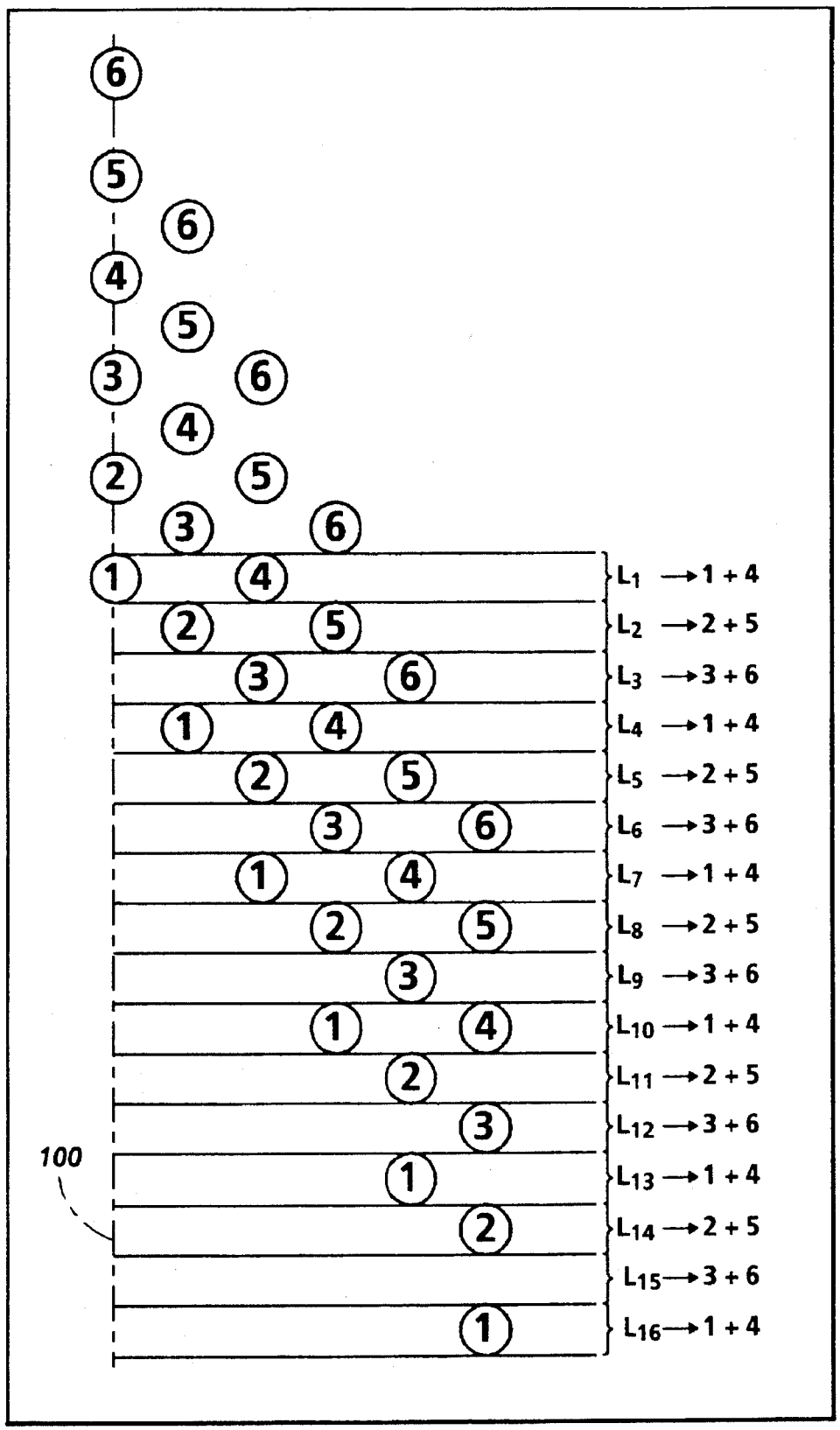
FIG. 8 shows an example of double scanning with six light beams in which the light beams have two scan line separation between them.

Referring To FIG. 8, there is shown an example of double scanning with 6 light beams. In this example, the light beams have to move by three scan lines in order to move from one scan line to the next line to be scanned and the number of scan line separation between the light beams should be 2. It should be noted that the line separation between the light beams can also be 4, 6, 8, etc. Also, in this case, since the system is a tri-level system, the 6 light beams should double scan the scan lines. Therefore, the intensity of the light beams should be adjusted in such a manner that three light beams should have one intensity ($I1=I2=I3$, I being the intensity of a light beam) to provide the white and black levels. Also, the other three light beams should also have one intensity ($I4=I5=I6$) to provide the color level. However, the intensity of the first three light beams should be different than the intensity of the second three light beams ($I1=I2=I3 \neq I4=I5=I6$). With this arrangement, any two light beams each being selected from a different group will provide the same white and color levels.

As it was previously mentioned, the same equation applies to xerographic systems with more exposure levels than three. For example, if a system has four exposure levels and if n is selected to be 2, then the number of the light beams should be equal to 6 and the light beams should move by two scan lines in order to move from one scan line to the next line to be scanned and the number of scan line separation between the light beams can be equal to 3.

By using equation $N=n(K-1)$, different combinations of light beams for different systems with different exposure levels can be designed.

What is claimed is:

1. A method of creating a required exposure for a printing system comprising the steps of:

scanning a scan line on a medium with a first light beam to create a first exposure level with the light beam off and a second exposure level with the light beam on; and overscanning said scan line on said medium with a second light beam by turning said second light beam on to add additional exposure to selected said second exposure levels to create a third exposure level, whereby said scan line will have three levels of medium exposure.

2. A method of creating a required exposure for a printing system comprising the steps of:

scanning a scan line on a medium with a first light beam to create a first exposure level with the light beam off and a second exposure level with the light beam on;

overscanning said scan line on said medium with a second light beam by turning the second light beam on to add additional exposure to selected said second exposure levels to create a third exposure level, whereby said scan line will have three levels of medium exposure; and simultaneously with the overscanning step, scanning another scan line on the medium with the first light beam to create at said another scan line a first exposure level with the light beam off and a second exposure level with the light beam on.

3. A method of creating a required exposure for a printing system comprising the steps of:

simultaneously scanning two scan lines on a medium with a first light beam and a second light beam to create at each scan line a first exposure level with the light beams off and a second exposure level with the light beams on;

simultaneously overscanning one of said scan lines on said medium with a third light beam and overscanning the other of said scan lines on said medium with a fourth light beam by turning the third and fourth light beams on to add additional exposure to selected said second exposure levels at said one scan line and at said other scan line to create a third exposure level at said two scan lines, whereby each scan line will have three levels of medium exposure; and simultaneously with the overscanning step, scanning another two scan lines on the medium with the first light beam and the second light beam to create at said another two scan lines a first exposure level with the light beams off and a second exposure level with the light beams on.

4. A method of creating a required exposure for a printing system comprising the steps of:

simultaneously scanning three scan lines on a medium with a first light beam, a second light beam and a third light beam to create at each scan line a first exposure level with the light beams off and a second exposure level with the light beams on;

simultaneously overscanning the first of said three scan lines on said medium with a fourth light beam, overscanning the second of said three scan lines on said medium with a fifth light beam and overscanning the third of said three scan lines on said medium with a sixth light beam by turning the fourth, fifth and sixth light beams on to add additional exposure to selected said second exposure levels at said first of said three scan lines, at said second of said three scan lines and at said third of said three scan lines to create a third exposure level at said three scan lines, whereby each scan line will have three levels of medium exposure; and simultaneously with the overscanning step, scanning another three scan lines on the medium with the first light beam, the second light beam and the third light beam to create at said another three scan lines a first exposure level with the light beams off and a second exposure level with the light beams on.

* * * * *